May 24, 1949.

E. H. LORENZ 2,471,336

APPARATUS FOR FEEDING BATCH TO
GLASS MELTING FURNACES

Filed Aug. 28, 1945

Witness:
A. A. Horn

Inventor:
Edward H. Lorenz
by Lloyd G. Bates
Attorney.

May 24, 1949.
E. H. LORENZ
2,471,336
APPARATUS FOR FEEDING BATCH TO
GLASS MELTING FURNACES
Filed Aug. 28, 1945
3 Sheets-Sheet 2
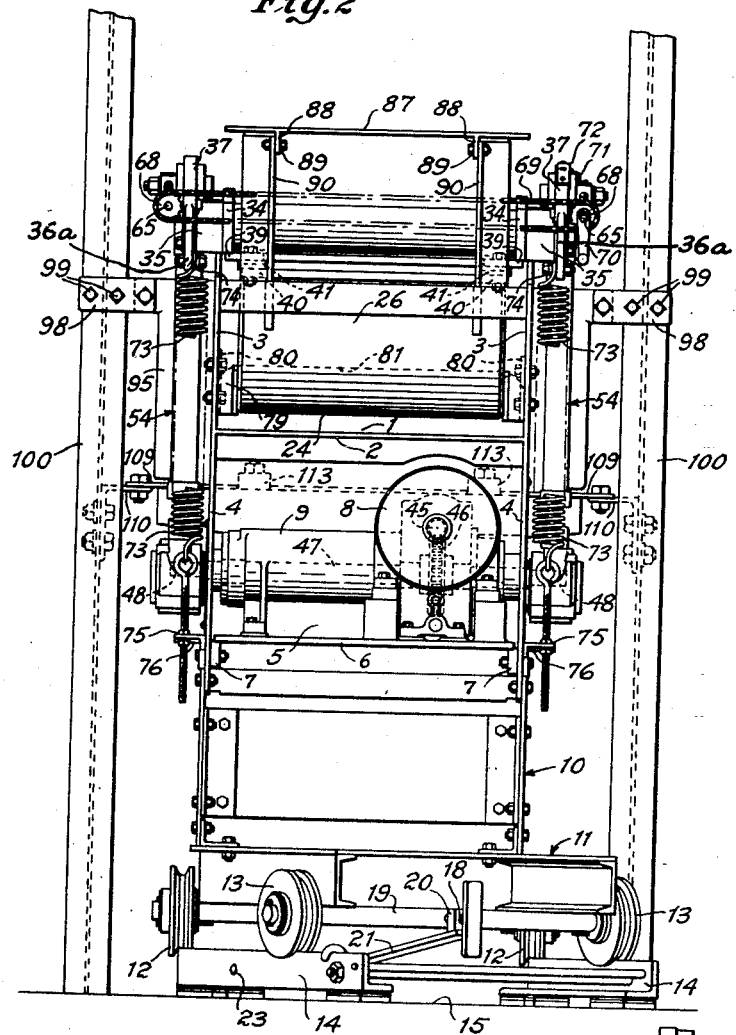
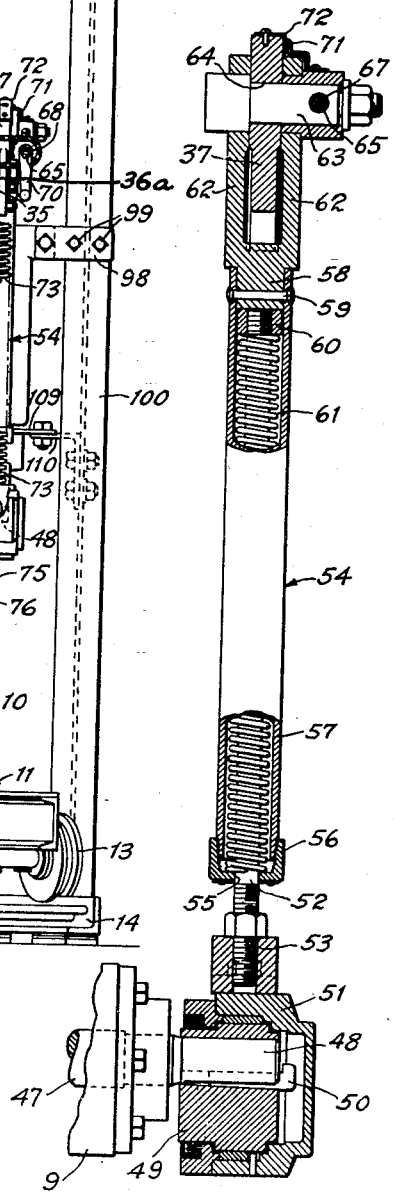
Witness:
A. A. Horn
Inventor:
Edward H. Lorenz
by Lloyd G. Butler
Attorney.

May 24, 1949.

E. H. LORENZ 2,471,336

APPARATUS FOR FEEDING BATCH TO
GLASS MELTING FURNACES

Filed Aug. 28, 1945

Witness:
A. A. Horn

Inventor:
Edward H. Lorenz
by Lloyd G. Bates
Attorney.

Patented May 24, 1949

2,471,336

UNITED STATES PATENT OFFICE 2,471,336

APPARATUS FOR FEEDING BATCH TO GLASS MELTING FURNACES

Edward H. Lorenz, West Hartford, Conn., assignor to Hartford-Empire Company, Hartford, Conn., a corporation of Delaware Application August 28, 1945, Serial No. 613,095

3 Claims. (Cl. 214—23)

This invention relates generally to improvements in devices for feeding glass-making materials or batch to glass melting furnaces and more particularly to batch feeders of that type which employs a mechanically operated feeding member to push or otherwise feed batch from a feed chamber into a glass-making furnace or tank to which the batch feeder has been applied.

In one form of batch feeder of the type to which the present invention more particularly relates, as disclosed in the U. S. patent to Hiller, No. 1,941,897, of January 2, 1934, the batch feed chamber has an outlet at its forward end from which batch may pass directly into a charging opening in a vertical wall of a melting furnace to which the batch feeder has been applied. The inlet of the batch feed chamber is at its top and well toward its forward end so that batch may be delivered by gravity through such inlet to fill the feed chamber from its forward or outlet end to the chamber inlet and until an accumulation of batch in the chamber rearwardly of the inlet has assumed a natural slope line. The batch feeding member is a plate which is curved arcuately from its rearward to its forward edge and is oscillated edgewise in the batch in the feed chamber about a horizontal axis coincident with the axis of curvature of the plate so that the forward edge of the plate moves in the batch along a substantially horizontal path toward and from the chamber outlet. The portion of the curved batch feed plate in the feed chamber is spaced from all adjacent batch confining or retaining walls of the chamber. This and the means for mounting and oscillating the plate edgewise in the batch are intended to preclude clogging of the device by uncrushed glass parisons or other relatively large pieces of cullet during the oscillations of the plate and to prevent the plate from impelling or carrying batch rearwardly by its retractive stroke in the feed chamber. The batch feeder is mounted on a wheeled truck so that it may be moved to and from an operative position against the furnace wall containing the charging opening.

In the form of batch feeder referred to, a crank having a driven connection with a motor transmits motion through a series of pivotally connected rigid links and levers to the curved batch feeding plate so as to oscillate the plate positively both on its forward, batch feeding stroke, and on its rearward, retractive stroke, the driving force being applied to the plate directly at only one side edge thereof.

In the improved batch feeder of the present invention, the batch feeding member is arcuately curved and is mounted to oscillate in the batch in the feed chamber about an axis coincident with the axis of curvature of the member, as in the prior batch feeder above referred to. However, instead of being a single, curved plate, providing only a thin, forward edge to push batch forward toward the charging opening of the furnace to which the batch feeder has been applied, the curved pusher of the improved feeder may be a curved hollow body of substantially rectangular configuration in cross section, providing a front end batch pushing surface having a vertical dimension at least several times the thickness of the plate of the prior batch feeder. The oscillating pusher of the batch feeder of the present invention therefore will impel more batch in a more accurately regulable manner during its forward, working stroke than the oscillating feeding member of the prior batch feeder. The present invention also provides an effective means of simple construction in dust-tight, wiping contact with the upper and side surfaces of the oscillating curved batch pusher to prevent batch and dust from being impelled or carried rearwardly in the feed chamber by the rearward, retractive stroke of the pusher.

A further improvement feature of the batch feeder of the present invention resides in the construction and mode of operation of the mechanism for oscillating the batch pusher in the feed chamber. This mechanism comprises a motor-driven crank and a connecting rod unit mounted at one end on the crank and connected at its opposite end to the oscillatory unit at one side of the latter, the connecting rod unit being constructed and arranged to actuate the pusher in the manner of a rigid link unless and until the pusher encounters an obstruction to its forward movement in the batch whereupon a spring in the rod unit will be compressed to increase the effective length of the unit so that the pusher may be halted until the obstruction has been removed while the crank continues to turn. Preferably, one such crank and its connecting rod unit and connections are provided at each of the opposite sides of the pusher. The connections between the connecting rod units and the pusher may be adjusted simultaneously and to the same extent by a simple and reliable adjusting mechanism to vary the amplitude of the strokes of the pusher.

The present invention contemplates the provision of a compressible gasket and associate structure to seal the connection between the batch feed chamber and the adjacent vertical wall of a melting furnace at the bottom and sides of the furnace charging opening when the batch feeder has been operatively applied to the furnace. Such structure may also be such as to provide for local cooling of the portion of the furnace wall surrounding the charging opening.

The batch feed chamber of the improved batch feeder of the present invention may be open at the top and rear to permit ready access to the interior of the chamber, as for insertion therein of a suitable tool or implement to break up or dislodge any substantial mass of batch or other large body of material beneath the pusher or in any other position in the feed chamber where it tends to obstruct or interfere with the operation of the feeder.

Other improved features of the batch feeder of the present invention hereinafter will be pointed out or will become apparent from the following description of a practical embodiment of such invention, as shown in the accompanying drawings, in which:

Fig. 2 is a rear or outer end view of the batch feeder;

Fig. 3 is a relatively enlarged detail view, mainly in vertical section substantially along the line 3—3 of Fig. 1, of the connecting rod unit and its connections in the batch pusher driving mechanism;

Figure 1:
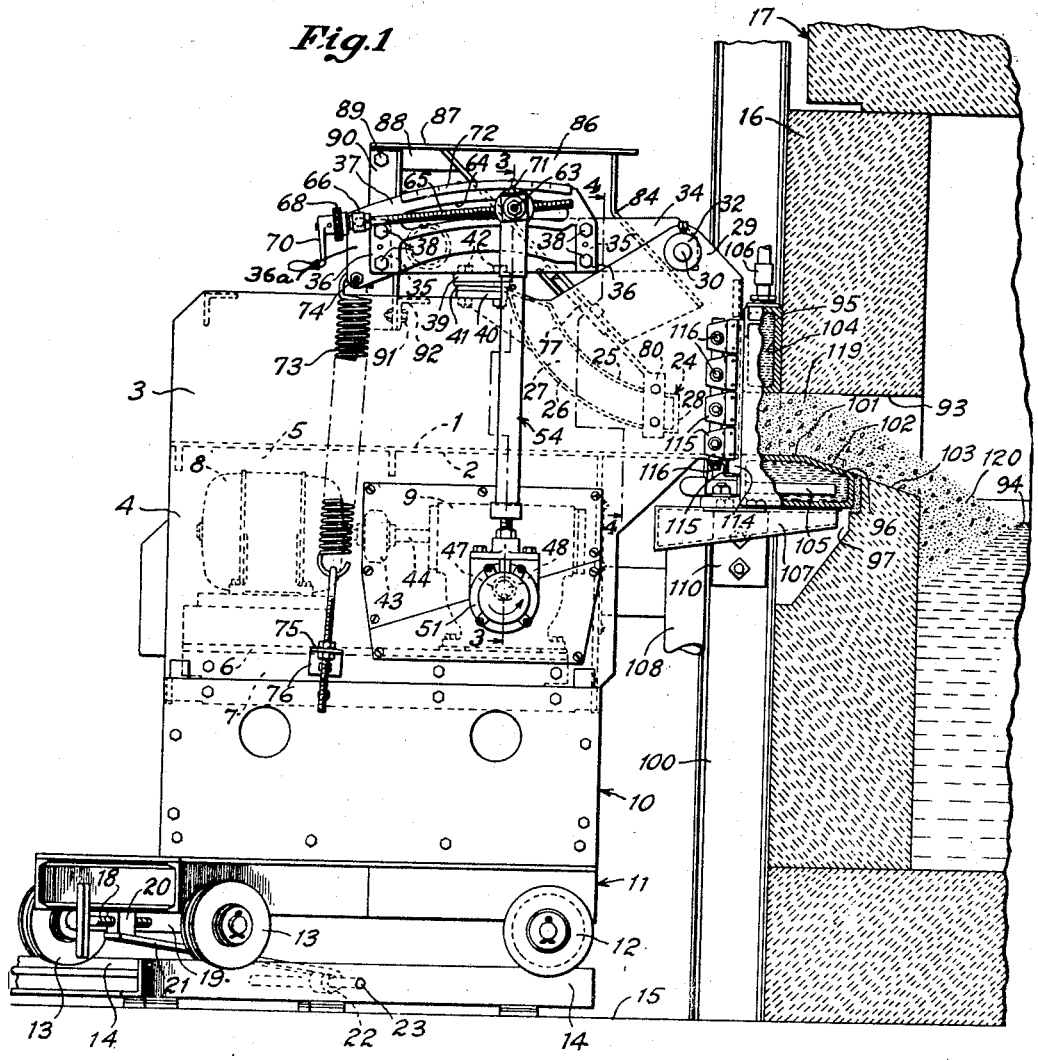
Fig. 1 is a side elevation of the improved batch feeder as applied to a glass melting furnace, a fragmentary portion only of the latter being shown and that in vertical section.

The improved batch feeder shown in the drawings comprises a feed chamber 1, Figs. 1, 2, 4 and 5, having a flat bottom wall 2 and a pair of straight, upstanding parallel side walls 3, one of which is shown to advantage in Fig. 1. The feed chamber 1 may be open at its top, rear end and front end, and the latter may serve as the feed outlet of the chamber as hereinafter will be explained.

The side walls 3 of the batch feed chamber may be upward continuations of side walls 4 of an underneath chamber 5, the bottom wall of which, designated 6, Figs. 1 and 2, may be formed separately from the side walls 4 and supported between them at the desired level, as on the supporting bars 7 which are attached to the inner sides of such side walls. The chamber 5 may house a motor 8 and a combined shaft and transmission housing 9 which may be supported upon and attached to the chamber floor 6 in a conventional manner.

The batch feeder structure above described may be carried by a framework 10 upon a truck or carriage 11, Figs. 1 and 2. The truck or carriage has a pair of peripherally grooved front wheels 12 and a pair of similar rear wheels 13. These are adapted to run upon track rails 14. The latter are supported upon the factory floor 15 at a place in the factory suitable to permit the batch feeder to be moved as a unit on the rails to and from an operative position in relation to a vertical wall 16 of a glass-making furnace or tank, a fragmentary portion of which is indicated generally at 17 in Fig. 1. When the batch feeder is in its operative position, as shown in Fig. 1, it may be retained there securely by the holding pressure exerted by a jack screw 18 on a rear axle 19 of the supporting truck or carriage 11, the jack screw being screwed through an apertured block or nut 20 on a bar 21 which is pivotally attached at its forward end, at 22, to a fixed cross rod 23 between the track rails. When the jack screw has been loosened, the bar 21 will swing downwardly about the axis of the cross rod 23 so that the truck axle will clear the jack screw when the batch feeder is withdrawn from its operative position. In the example shown, the axes of rotation of the rear wheels 13 and of the front wheels 12, respectively, are oblique to each other, and the parallel track rails therefore are longitudinally curved suitably to permit both pairs of wheels to run properly on these rails. The axes of rotation of these pairs of wheels may, however, be parallel and in that event the track rails may be straight.

The oscillatory batch feeding member or pusher of the batch feeder may comprise a body, designated 24, which is curved arcuately from its rearward to its forward edge and has its concavely curved surface uppermost, as best seen in Fig. 1. The pusher body 24 may be made of metal, or other suitable material, suitably formed to make the body hollow for the sake of lightness and of substantially rectangular configuration in cross-section and of uniform thickness throughout the portion thereof that works in the batch in the feed chamber. The pusher body thus has parallel, arcuately curved top and bottom walls, 25 and 26, respectively; parallel similar side walls 27; and a substantially rectangular front end wall 28. The front end wall 28 of the pusher body will contact with and push a substantial amount of batch in the feed chamber ahead of the pusher when the latter is moved on its forward, working stroke.

Figure 4:
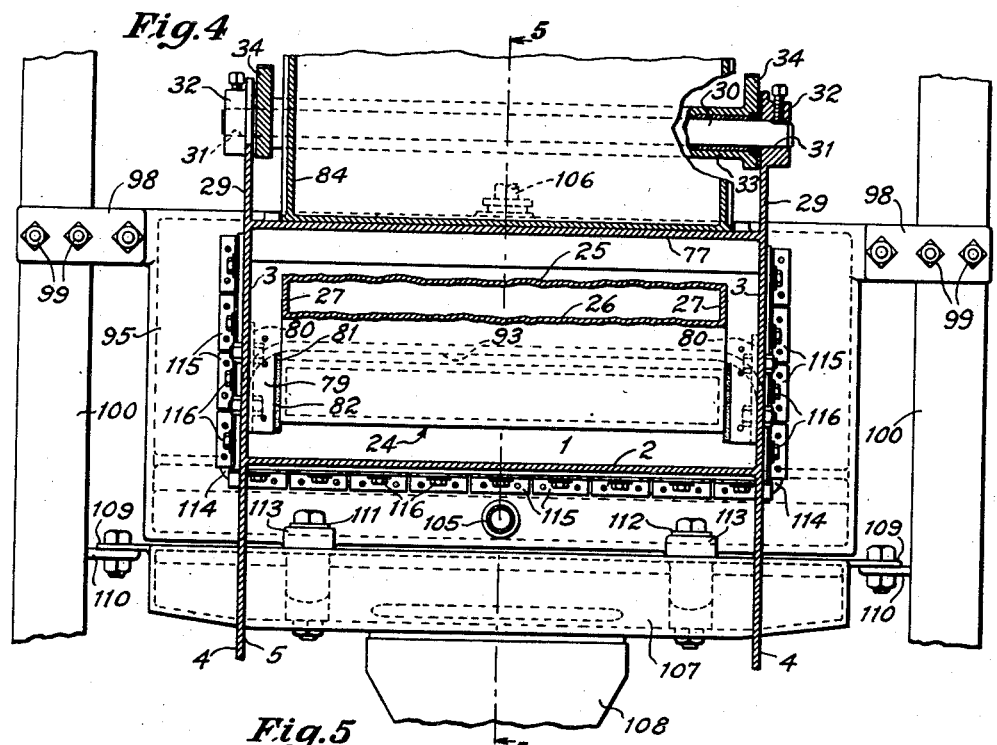
Fig. 4 is a relatively enlarged, fragmentary vertical sectional view along approximately the line 4—4 of Fig. 1.

The side walls 3 of the batch feed chamber have upwardly projecting portions 29. A transversely extending shaft or axle 30 has its opposite end portions secured in aligned openings 31 in externally embossed or thickened portions 32 of these upward wall extensions 29, as best seen in Fig. 4. A tubular hub 33 is rotatably mounted on the axle 30 and extends thereon between the members 29, being provided at its opposite ends with a pair of rearwardly extending lever arms 34 which are best seen in Fig. 1 and are also shown in Fig. 2 and in part in Figs. 4 and 5. Rearwardly of the upward extensions 29 of the chamber side walls 3, each lever arm 34 is provided with a pair of spaced outwardly projecting bosses or lugs 35, Figs. 1 and 2, to which the end portions 36 of an attaching strip 37 are firmly secured, as by cap bolts 38, Fig. 1. The attaching strip thus is spaced outwardly from the lever arm 34 to which it is secured and together with the latter constitutes a lever for supporting and oscillating the pusher body 24 in the batch feed chamber. The pusher body 24 it attached at the rear of its upper end to the lever arms 34 in the example shown through the agency of inwardly extending flat attaching lugs 39, both shown in Fig. 2 and one in Fig. 1, on the lever arms 34; cooperative rearwardly extending flat attaching lugs 40 on the upper part of the pusher body; suitable shims or spacers between these lugs as indicated at 41; and bolts 42 by which these parts are fastened securely together.

The motor 8, hereinbefore referred to, is operatively connected through a coupling 43, a shaft 44, Fig. 1, and enmeshed gears 45 and 46, respectively, Fig. 2, with a driven shaft 47 which is rotatably mounted in the housing 9 and has its opposite end portions, designated 48, projecting outwardly beyond the side walls of the chamber 5. Each of these projecting end portions 48 of the shaft 47 carries a crank, one of which is shown at 49 in Fig. 3, fixed thereto as by a key 50. Each eccentric is provided with a crank strap or housing 51 which is connected to the lower end portion of a rod 52, the connection being a threaded one, as indicated at 53, and therefore adjustable. The rod 52 is one of two telescopically associated sections of a connecting rod or driving link, which as a whole is designated 54 in Figs. 1, 2 and 3, the component parts thereof being shown in detail in the latter view. As shown in Fig. 3, the rod 52 extends upwardly through a central aperture 55 in the head of a cap 56 on the lower end of a tubular member 57 and in the bore of the latter into abutting relation at its upper end with a plug 58 which is fixed in place, as by the pin 59, in the upper end portion of the tubular member 57. A nut 60 is carried by the upper end portion of the rod 52 and is slidable with the rod in the bore of the tubular member 57. A coil spring 61 encircles the rod 52 within the tubular member 57 and is compressed at its ends between the nut 60 and the head of the cap 56. The pressure exerted by the spring on these parts tends to maintain the upper end of the rod 52 at the limit of its telescoping movement in the tubular member 57, that is, against the plug 58, and to resist elongation of the connecting rod by separation of these parts. The plug 58 is formed to provide a pair of integral upstanding arms 62 which straddle the attaching strip 37 on the lever arm 34 and carry between them a pivot pin 63 which extends through and is slidable along an arcuate slot 64, best seen in Fig. 1, whereby the connecting rod unit is pivotally and adjustably connected to the pusher supporting lever. By adjusting along the slot the place of connection of the connecting rod with the pusher supporting lever, the working strokes of the pusher may be varied. Since there is a pusher supporting lever and a connecting rod at each of the sides of the batch feed chamber, a mechanism may be provided to adjust the places of connection of the connecting rods with their levers simultaneously and to the same extent. This may comprise an adjusting screw 65 at each side of the batch feed chamber, each such screw being rotatably supported in a bearing 66 on the adjacent attaching strip 37 as shown for one of the screws 65 in Fig. 1 and each being screwed through and threadedly engaged with a transverse opening 67 in a portion of the pivot pin 63. The screws 65 are provided with sprockets 68 connected by chain 69, Fig. 2, and one of the screws is provided at its rearward end with a crank handle 70. When this is turned, both adjusting screws will be turned in unison and will effect like adjustments of the connections of the two connecting rods with their respective pusher levers. An index element or pointer 71 may be mounted for movement with the pivot pin 63, Fig. 3, along a scale strip 72 on the attaching strip 37, Fig. 1, so as to indicate the extent of adjustment of the connection of a connecting rod with its lever.

A coil spring 73, Fig. 1, is attached at its upper end, as at 74, to an integral end extension or ear 36a on the rearward end portion of the attaching strip 37 and is adjustably connected at its lower end, as at 75, to a bracket 76 on the framework structure. There are two of these springs 73, one at each side of the batch feeding chamber, as appears from Fig. 2. These springs are under tension and exert a balanced downward pull on the pusher-carrying levers. In consequence, the forward stroke of the pusher in the batch feed chamber will be caused by the coil springs 73 and 61, the speed of such forward stroke being controlled by the rate of revolution of the motor driven cranks so long as there is no unyielding obstruction in the feed chamber to the forward movement of the pusher. Should the pusher encounter such an obstruction, its forward movement will be halted, the springs 61 of the connecting rod units will be compressed, and the lower sections of these connecting rods will be pulled downwardly independently of the upper sections of such connecting rods by their connected cranks. A suitable tool or implement, not shown, may be inserted into the feed chamber beneath the pusher to remove or break up the obstruction, without stoppage of the motor for driving the cranks or injury thereto. The rearward or return stroke of the pusher, against the resistance of the springs 73, will be effected by the cranks, acting through the connecting rods which then are in their fully telescoped condition, as shown in Fig. 3.

Figure 5:
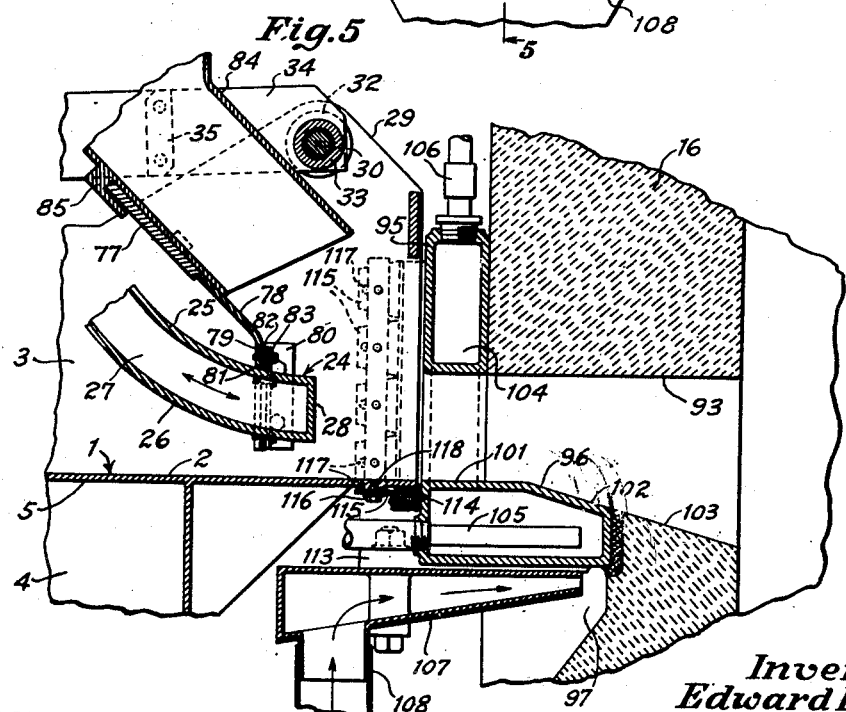
Fig. 5 is a fragmentary section along the line 5—5 of Fig. 4, showing the cooling and sealing provisions between the outlet end of the batch feed chamber and the adjacent furnace wall.

The forward portion of the batch feed chamber, in which the oscillating pusher works, is partially separated from the remaining, more rearwardly portion of the feed chamber by a transverse wall which comprises a forwardly and downwardly inclined upper section 77, Figs. 4 and 5, welded or otherwise secured at its ends to the side walls 3 of the batch feed chamber. The wall section 77 is located above the oscillating pusher 24. A lower section of this transverse wall comprises a forwardly and downwardly inclined transverse portion 78 and a vertical lower portion 79. This lower section of the transverse wall may be positioned with its upper portion disposed edgewise against the lower edge of the upper section 77, as by being provided with brackets 80, Figs. 2, 4 and 5, attached to the side walls 3 of the batch feed chamber. The vertical lower portion 79 of this transverse wall is cut away or apertured, as at 81, Figs. 2, 4 and 5, to afford clearance for the oscillating pusher 24. A gasket or packing strip 82 is secured in place on the front surface of the part 79 of the transverse wall around the edge of the aperture 81, as by clamping means such as shown at 83, Fig. 5, so as to project beyond the edge of the aperture 81 against the side and upper surfaces of the oscillating pusher. The strip 82 may be made of brake-lining or any other suitable material. By the arrangement just described, dust is prevented from passing rearwardly from the front portion of the batch feed chamber above or at the sides of the pusher and any batch that otherwise would be carried rearwardly by the pusher on its return stroke is wiped or positively removed therefrom.

The upper section 77 of the transverse wall above mentioned may serve also as a support for a batch supply hopper or chute 84. As best seen in Fig. 5, this hopper or chute may be provided on its bottom with a flat hook 85, which is hooked over the transverse member 77. The chute or hopper 84 may have an upwardly enlarging upper portion 86, provided at its top with a rearwardly extending web 87 having attaching ears 88 thereon fastened, as at 89, Fig. 2, to upstanding angle arms 90. The latter are attached, as at 91, Fig. 1, to a transverse angle bar 92 which spans the upper rearward portion of the batch feed chamber and is secured in place in any suitable manner, as by welding to the side walls of that chamber.

The vertical wall 16 of the glass making tank or furnace to which the batch feeder is applied in Fig. 1, has a charging opening 93 formed therein above the level, indicated at 94, of the glass bath in such tank or furnace. The outer portion of the furnace wall 16, around the charging opening 93, may be cooled by a hollow water-cooled cooling frame 95. The hollow water-cooled frame 95 extends around the charging opening and, as shown, has an inwardly extending bottom portion 96 located in a recess 97 in the bottom portion of the bottom of the outer part of furnace wall at the bottom of the charging opening 93. The water-cooled frame is supported in place in any suitable manner, as by being provided with lateral attaching strips 98 fastened by bolts 99 to upright girdles 100 of the frame structure of the tank or furnace. The arrangement is such that the lower portion of the water-cooled cooling frame constitutes a water-cooled sill for the charging opening 93. As shown, the outer part, 101, of the upper surface of this water-cooled sill is horizontal and level with the upper surface of the bottom wall or floor 2 of the batch feed chamber. The upper surface of the water-cooled sill then may slope downwardly and inwardly, as at 102, Fig. 1, to conform to the slope of the remaining portion, 103, of the bottom wall of the charging opening 93.

The internal space or circulation chamber 104 within the water-cooled frame may be supplied with water or other cooling fluid from a supply pipe 105, which extends into the sill portion of the frame. A fluid discharge pipe 106 is operatively connected to the upper part of the water-cooled frame.

A cooling nozzle 107, provided with a supply pipe partially shown at 108 in Figs. 1, 4 and 5, may be supported in position to discharge air or other cooling fluid into the recess 97 of the tank wall 16 beneath the water-cooled sill. The nozzle has attaching ears 109 fastened upon projecting lugs 110 on the girders 100, Figs. 2 and 4. It also may be attached, as at 111 and 112, Fig. 4, to integral rearwardly extending lugs 113 on the lower portion of the water-cooled frame.

A sealing strip or gasket 114 is secured at the bottom and sides of the outlet end of the batch feed chamber, as in a groove provided by attaching a series of Z-shaped lugs 115, Figs. 1, 4 and 5, to the outlet end portion of the batch feed chamber. The sealing strip or gasket 114 may project beyond such outlet end against the bottom and sides of the water-cooled frame around the charging opening in the wall of the furnace or tank. The individual lugs may be adjusted fore-and-aft in respect to the edge of the batch chamber outlet as each is attached to its supporting wall by a cap bolt 116 extending through a slot 117 in the lug and screwed into a suitable threaded opening 118 in that wall. The arrangement is such that the sealing strip or gasket 114, which may be made of asbestos or other suitable, compressible, heat-resistant material, will be compressed when the batch feeder is moved to position against its tank or furnace to effectually seal the space between the latter and the outlet end of the batch feeder to a sufficiently high level to preclude spilling of batch between these parts.

From the foregoing description of the embodiment of the invention shown in the drawings, the operation thereof will be readily understood.

Batch may be supplied to the batch feed chamber through the hopper from any suitable source, not shown, to fill the forward portion of the batch feed chamber to the level of the outlet of the batch supply hopper. Batch, indicated at 119 in Fig. 1, then will continuously fill the communicating feed chamber outlet and at least the outer portion of the tank or furnace charging opening. Each forward stroke of the pusher 24 will cause a forward impulse on batch in the charging opening so that batch will be fed from the charging opening downwardly into the glass bath, as indicated at 120 in Fig. 1. The forward or working strokes of the batch pusher may be adjusted to obtain the desired batch feeding results.

I claim:

1. A batch feeder comprising a chamber adapted to receive a continuous supply of batch and having a forward end portion provided with an outlet, a shaft extending transversely across and above said chamber, an arcuately curved batch pusher mounted to oscillate about the axis of said shaft in the batch in said chamber toward and away from said outlet, the axis of the curvature of said pusher coinciding with the axis of said shaft, a transverse wall in said chamber having an aperture in its lower portion through which the pusher oscillates, a packing on said transverse wall around said aperture and in wiping contact with the surface of the oscillating pusher, a lever on each side of the pusher and fixedly connected thereto, each lever having an arcuate slot therein, a shaft extending below said chamber in a direction transverse thereof, a crank on each of the opposite ends of said second-named shaft, means for rotating the second-named shaft about its axis, a connecting rod comprising an upper section and a lower section telescopically associated with each other and a compression spring acting on said sections to resist separation of said sections, said compression spring being arranged to yield if the pusher encounters an obstruction, the lower section of said connecting rod being mounted on the crank at a side of the pusher and the upper section of the connecting rod being adjustably connected with the slotted portion of the corresponding lever, there being a connecting rod at each of the opposite sides of the pusher, and a vertically disposed coil spring at each of the opposite sides of the pusher, each coil spring being attached at its upper end to the free end of said slotted lever and at its lower end to a fixed support so as to be under tension and to urge said pusher on its forward stroke.

2. A batch feeder in accordance with claim 1 and, in combination therewith, a mechanism for adjusting in unison the connections of the upper sections of said connecting rods with the slotted portions of their levers.

3. A batch feeder comprising a chamber adapted to receive a continuous supply of batch and having a forward end portion provided with an outlet, a shaft extending transversely across and above said chamber, an arcuately curved batch pusher mounted to oscillate about the axis of said shaft in the batch of said chamber toward and away from said outlet, the axis of the curvature of said pusher coinciding with the axis of said shaft, a transverse wall in said chamber having an aperture in its lower portion through which the pusher oscillates, a packing on said transverse wall around said aperture and in wiping contact with the surface of the oscillating pusher, a lever at a side of the pusher and fixedly connected thereto, said lever having an arcuate slot therein, a shaft extending below said chamber in a direction transverse thereof, a crank on said second-named shaft, means for rotating the second-named shaft about its axis, a connecting rod comprising an upper section and a lower section telescopically associated with each other and a compression spring acting on said sections to resist separation of said sections, said compression spring being arranged to yield if the pusher encounters an obstruction, the lower section of said connecting rod being mounted on the crank and the upper section of the connecting rod being adjustably connected with the slotted portion of said lever, and a vertically disposed coil spring attached at its upper end to the free end of said slotted lever and at its lower end to a fixed support so as to be under tension and to urge said pusher on its forward stroke.

EDWARD H. LORENZ.

REFERENCES CITED

The following references are of record in the file of this patent:

UNITED STATES PATENTS

| Number | Name | Date |
|---|---|---|
| 1,718,861 | Huth | June 25, 1929 |
| 1,941,897 | Hiller | Jan. 2, 1934 |
| 2,327,887 | Halbach et al. | Aug. 24, 1943 |